United States Patent
Lu et al.

(10) Patent No.: US 7,700,032 B1
(45) Date of Patent: Apr. 20, 2010

(54) FORMATION OF MICROSPHERES THROUGH LASER IRRADIATION OF A SURFACE

(75) Inventors: Ryan P. Lu, Carlsbad, CA (US); Ayax D. Ramirez, Chula Vista, CA (US); Ozzie Csanadi, San Diego, CA (US); Stephen D. Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/172,366

(22) Filed: Jul. 14, 2008

(51) Int. Cl.
*B23K 26/00* (2006.01)
*H01L 21/312* (2006.01)
(52) U.S. Cl. .................. 264/400; 264/409; 264/482
(58) Field of Classification Search .............. 264/400, 264/138, 139, 163, 402, 403, 405, 409, 482; 216/2; 425/174.4, 6, 7; 219/121.66, 121.69, 219/121.85
See application file for complete search history.

(56) References Cited

U.S. PATENT DOCUMENTS

| 5,017,277 | A | * | 5/1991 | Yoshida et al. ......... 204/298.02 |
| 5,227,608 | A | * | 7/1993 | Yoshida et al. ......... 219/121.68 |
| 5,585,020 | A | | 12/1996 | Becker et al. |
| 6,650,480 | B2 | * | 11/2003 | Tanaka ....................... 359/618 |
| 6,906,449 | B2 | | 6/2005 | Kucherov et al. |
| 6,941,033 | B2 | | 9/2005 | Taylor et al. |
| 6,984,404 | B1 | | 1/2006 | Talton et al. |
| 2002/0027716 | A1 | * | 3/2002 | Tanaka ....................... 359/621 |
| 2003/0184188 | A1 | | 10/2003 | Kucherov et al. |
| 2004/0248386 | A1 | * | 12/2004 | Nishitani et al. ............ 438/478 |
| 2006/0049547 | A1 | * | 3/2006 | Khang ....................... 264/400 |
| 2007/0282247 | A1 | | 12/2007 | Desai et al. |
| 2009/0117712 | A1 | * | 5/2009 | Sakamoto et al. ........... 438/463 |

* cited by examiner

*Primary Examiner*—Joseph S Del Sole
*Assistant Examiner*—Nahida Sultana
(74) *Attorney, Agent, or Firm*—Kyle Eppele; J. Eric Anderson

(57) ABSTRACT

A laser ablation process is applied to a semiconductor substrate causing the semiconductor material surface and subsurface to be superheated to the point where material is ablated from the material substrate. Optional subsequent laser pulse(s) liquefy the particles, preferably while suspended in air, and the material surface tension causes the liquefied droplet of semiconductor material to form a sphere. The droplet preferably solidifies in air before reaching the substrate of its origin or another substrate for collection.

12 Claims, 3 Drawing Sheets

FORMATION OF MICROSPHERES THROUGH LASER IRRADIATION OF A SURFACE

FEDERALLY-SPONSORED RESEARCH AND DEVELOPMENT

This disclosure (Navy Case No. 098432) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice 619-553-2778; email T2@spawar.navy.mil.

BACKGROUND

1. Field

This present disclosure relates to forming microspheres, particularly silicon microspheres, through laser, particularly pulsed laser and/or focused laser, irradiation and ablation of a material surface.

2. Background

Lasers have for many years been used to scribe and anneal a variety of materials, including semiconductor materials such as silicon wafers. Randomly sized and shaped ablated material has heretofore been a waste by-product of such activities.

As technologies push the limits of scaling to smaller dimensions, there is a need to engineer materials on the microscale in order to provide unique functionality and capabilities. One field in which this has been demonstrated is photonic devices, in which the need for low-cost products has stimulated a significant amount of research in silicon photonics. Silicon is transparent in the standard ITU optical communication bands, which is a factor in selecting silicon for passive and active optoelectronic devices.

The silicon microsphere shows promise as a building block for silicon microphotonics, a complementary technology to the already well established CMOS microelectronics technology for the realization of future microelectro-photonic integration. Numerous potential applications can be realized by using microspheres, including microlasers, channel dropping filters, optical switching, ultrafine sensing, displacement measurement, rotation detection, high-resolution spectroscopy, and Raman lasers.

Microsphere production is currently utilized in several techniques which are used routinely in the powder metallurgy industry. Unfortunately, many of these techniques are not applicable to silicon sphere production because of contamination and other materials-related problems. Such techniques usually require contact of the molten metal with crucibles, nozzles, or other system parts, and so each such metal object presents a new set of materials contamination and compatibility problems. The materials problems are particularly challenging when the desired product is something approximating the purity of semiconductor grade silicon, which does not tolerate significant impurities for most applications. Further, the current technology is limited because the techniques of forcing molten silicon through a nozzle typically produces spheres having diameters between 250 µm and 500 µm.

There is therefore a need for an apparatus and methods to form microspheres in an easily manufactured, high volume process. Further, there is a need to dispose of scrap wafers generated in the semiconductor fabrication process.

Generally, the techniques described herein are intended to meet the general need for forming microspheres of any ablatable material. The examples provided herein focus on the specific example of semiconductor materials, and more particularly silicon; however, these are given as non-limiting examples.

SUMMARY

The present disclosure relates to a method and apparatus for forming microspheres, comprising:
 providing a base material substrate suitable for producing microspheres, which has at least one target surface and a subsurface beneath the target surface;
 applying energy to the material substrate using a first laser beam, said applied energy sufficient to heat the material substrate surface and subsurface to result in ablation of material from the surface of the substrate to a controlled, selected depth to produce ablated material particles;
 permitting the ablated material particles to traverse a second laser beam so as to melt the ablated material particles to form a pre-selected particle geometry;
 permitting the ablated material to resolidify; and
 collecting the ablated material.

The present disclosure further relates to an apparatus for forming microspheres, comprising:
 a first laser beam for applying energy to a material substrate, said applied energy sufficient to heat the material substrate surface and subsurface to result in ablation of material from the surface of the substrate to a controlled, selected depth to produce ablated material particles;
 a second laser beam for melting ablated material particles;
 a cooling portion for permitting melted material particles to resolidify; and
 a collection portion for collecting resolidified material particles.

Additionally, the present disclosure relates to a microsphere product produced by a process as described above.

BRIEF DESCRIPTION OF THE DRAWINGS

FIG. 1A depicts a first laser beam directed onto a substrate.

FIG. 1B depicts the first laser beam ablating the surface of the substrate, ejecting small particles of molten material.

FIG. 1C depicts the ablated material falling back onto the surface of the substrate.

DETAILED DESCRIPTION

Overview

Figure 1A:
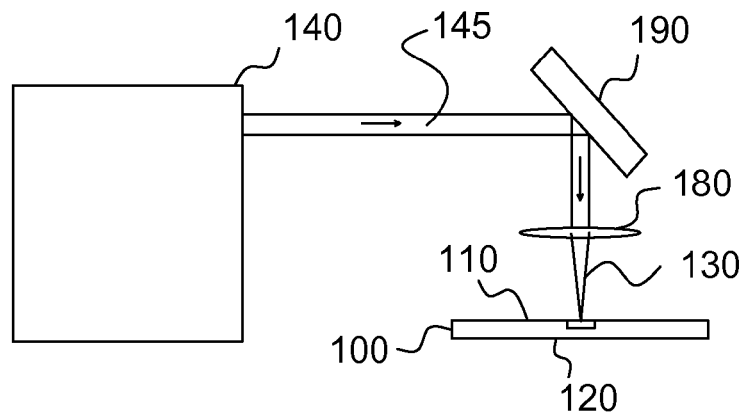
FIGS. 1A-1C are diagrams schematically depicting one aspect of the disclosed techniques.

Photonics is the science of generating, controlling, and detecting photons, particularly in the visible and near infrared spectrum, but also extending to the ultraviolet (0.2-0.35 µm wavelength), long-wave infrared (8-12 µm wavelength), and far-infrared/THz portion of the spectrum (e.g., 2-4 THz corresponding to 75-150 µm wavelength). The science of photonics includes the emission, transmission, amplification, detection, modulation, and switching of light. Photonic devices include optoelectronic devices such as lasers and photodetectors, as well as optical fiber, photonic crystals, planar waveguides, and other passive optical elements. Applications of photonics include light detection, telecommunications, information processing, illumination, metrology, spectroscopy, holography, medicine (surgery, vision correction, endoscopy, health monitoring), military technology, laser material processing, visual art, biophotonics, agriculture and robotics.

As technologies push the limits of scaling to smaller dimensions, there is a need to engineer materials on the microscale and smaller dimensions in order to design unique functions and capabilities. One field which has demonstrated this is the need for low-cost photonic devices which has stimulated a significant amount of research in silicon photonics. Although silicon photonics is less well-developed as compared to Group III-V semiconductor technologies, it has the potential to make a huge impact on the optical communications industry, as well as in many other photonic applications. Silicon is transparent in the standard ITU optical communication bands, which is a factor in selecting silicon for passive and active optoelectronic devices.

Silicon photonics and silicon microphotonics refer to the technology disciplines related to production of optical switching electronic devices using integrated circuit manufacturing technology. The silicon microsphere shows promise as a building block for silicon microphotonics, a complementary technology to the already well established CMOS microelectronics technology for the realization of future microelectro-photonic integration. Numerous potential applications have been realized by using microspheres such as microlasers, channel dropping filters, optical switching, ultrafine sensing, displacement measurement, rotation detection, high-resolution spectroscopy, and Raman lasers.

In one example, microspheres have recently gained an important place in the optical microcavity resonator community due to their high quality factor morphology-dependent resonances (MDRs). Morphology-dependent resonances (MDRs) refers to resonances found in certain types of optical cavity that are cylindrical, spherical, and ellipsoidal in shape. Conditions under which the resonances occur depend on shape as well as refractive index of material within the optical cavity, and are normally characterized by two integers, namely, order number and mode number.

Silicon microspheres with high quality factor MDRs are used for resonant detection and filtering of light in the near infrared. The light is coupled to the silicon microsphere with optical fiber half couplers in the near-IR. The observed morphology dependent resonances have quality factors on the order of 100,000, and reported in the literature as high as 100,000,000. The experimentally measured quality factors are limited by the sensitivity of the experimental setup; however, the microsphere quality factor is several magnitudes of order higher than current microring resonators. These optical resonances provide the necessary narrow linewidths, that are needed for high resolution optical filtering applications, Raman lasers, modulators, and CMOS-compatible detectors in the near-IR.

Another significant application of silicon microspheres is within the solar cell. The spherical solar cell geometry has many potential advantages over planar cells produced from ribbons or ingots. A small sphere is a very stable melt configuration due to the relatively high surface tension of molten silicon. In addition, the high surface area to volume ratio facilitates high solidification rates. The microsphere production is demonstrated in several high-throughput low-cost techniques used routinely in the powder metallurgy industry. The spherical geometry is also a mechanically strong cell configuration which allows simplified materials handling at least through the junction formation process. At this point, the spheres can easily be incorporated into thin glass or plastic sheets yielding large area arrays of arbitrary size. Unfortunately, many of these techniques are not applicable to silicon sphere production because of contamination and other materials related problems. Such techniques usually require contact of the molten metal with crucibles, nozzles, or other system parts, and so each such metal object presents a new set of materials contamination and compatibility problems. The materials problems are particularly challenging when the desired product is something approximating the purity of semiconductor grade silicon, which does not tolerate significant impurities for most applications. Further, the current technology is limited because the current techniques of forcing molten silicon through a nozzle typically produces spheres having diameters between 250 μm and 500 μm.

In a further example, microspheres are used to produce photonic crystals. Photonic crystals are composed of periodic dielectric or metallo-dielectric (nano)structures that affect the propagation of electromagnetic waves (EM) in the same way as the periodic potential in a semiconductor crystal affects the electron motion by defining allowed and forbidden electronic energy bands. Essentially, photonic crystals contain regularly repeating internal regions of high and low dielectric constant. Photons (behaving as waves) propagate through this structure, or not, depending on their wavelength. Wavelengths of light (stream of photons) that are allowed to travel are known as "modes". Disallowed bands of wavelengths are called photonic band gaps. This gives rise to distinct optical phenomena such as inhibition of spontaneous emission, high-reflecting omni-directional mirrors and low-loss-waveguiding, amongst others.

There is therefore a need for an apparatus and methods to form microspheres with dimensions below 500 μm, and especially below 250 μm amenable for use with photonic devices in an easily manufactured, high volume process. Generally, the techniques described herein are intended to meet the general need for forming microspheres of any ablatable material. The examples given above focus on the specific example of semiconductor materials, and more particularly silicon; however, these are given as non-limiting examples. Similarly, the term microspheres is not limited to dimensions on the order of 250 μm, but also includes substantially spherical objects with smaller dimensions that may be commonly called by other names, for example nanospheres.

Exemplary Embodiments

This disclosure describes a method and apparatus for forming microspheres of an ablatable material. Beneficially, scrap wafers generated in the semiconductor fabrication process may be used as the substrate for making microspheres. Laser ablation is the process of removing material from a solid, or liquid, surface by irradiating it with a laser beam. At relatively lower laser fluence (or energy density), as practiced in the present disclosure, the material is heated by the absorbed laser energy and evaporates or sublimates. At relatively higher laser fluence, the material is typically converted to a plasma. Usually, laser ablation refers to removing material with a pulsed laser, but it is possible to ablate material with a beam if the laser fluence is high enough. The depth over which the laser energy is absorbed, and thus the amount of material removed by a single laser pulse, depends on the material's optical properties and the laser wavelength. Laser ablation is greatly affected by the nature of the material and its ability to absorb energy, therefore the wavelength of the ablation laser should have a minimum absorption depth.

Figure 1B:
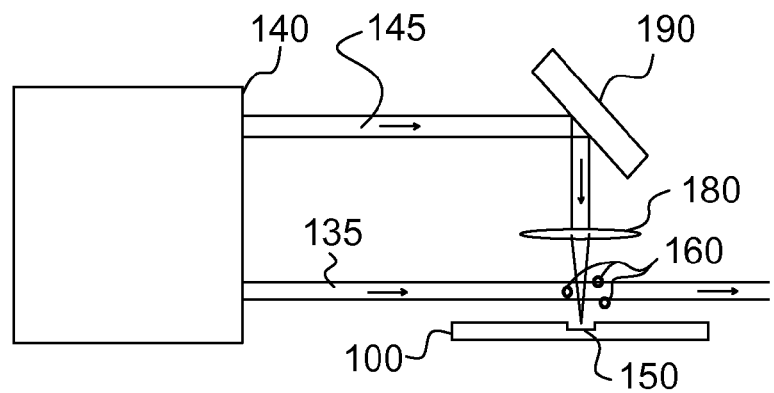
Figure 1C:
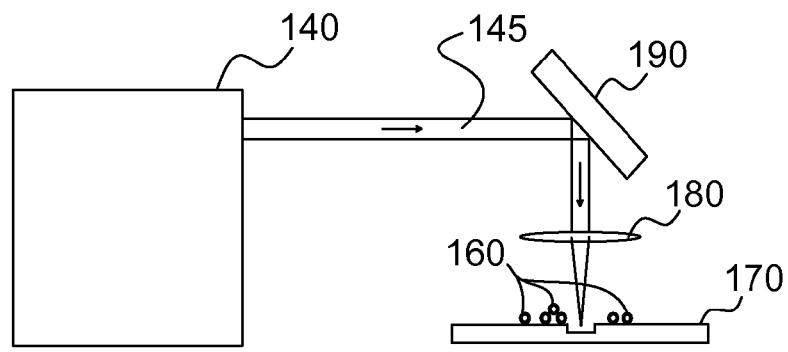

Thus, referring to FIGS. 1A, 1B, and 1C, the present disclosure relates to a method for forming microspheres, comprising:

providing a base material substrate (100) suitable for producing microspheres, which has at least one target surface (110) and a subsurface beneath the target surface (120);

applying energy (130) to the material substrate using a first laser beam (145), said applied energy sufficient to heat the material substrate surface and subsurface to result in ablation of material from the surface of the substrate to a controlled, selected depth (150) to produce ablated material particles (160);

permitting the ablated material particles to traverse a second laser beam (135) so as to melt the ablated material particles to form a pre-selected particle geometry;

permitting the ablated material to resolidify; and collecting the resolidified ablated material (170).

The present disclosure further relates to an apparatus for forming microspheres, comprising:

a laser (140) for applying energy in a first laser beam (145) to a material substrate (100), said applied energy sufficient to heat the material substrate surface (110) and subsurface (120) to result in ablation of material from the surface of the substrate to a controlled, selected depth (150) to produce ablated material particles (160);

a second laser beam (135) for melting ablated material particles;

a cooling portion for permitting melted material particles to resolidify; and a collection portion for collecting resolidified material particles (170). FIGS. 1A, 1B, and 1C also disclose an optional optical element (180) to control the laser beam profile and optional mirror (190) to control the laser beam direction as desired. One or more of these components, or related optical devices, may be employed by one skilled in the art to optimize a particular configuration for the job at hand following the teachings contained herein.

Additionally, the present disclosure relates to a microsphere product produced by a process as described above.

In one aspect of the disclosure, high purity semiconductor microspheres are formed using a pulsed laser or a continuous wave laser as the focused laser. Pulsed lasers are generally preferred. In the most general case, a laser is used to illuminate a substrate with sufficient fluence (energy density) to ablate material from a substrate, and while the ablated material is suspended away from the substrate, it is preferably illuminated again, such that the ablated material is melted and surface tension allows resolidification into substantially the form of a sphere on the approximate scale of less than 10 µm. The solidification rate can be modified in order to control the shape of the resulting particles.

The initial laser illumination is preferably performed using a pulsed laser, for example an excimer laser, as the laser. In the pulsed mode of operation, the output of a laser varies with respect to time, typically taking the form of alternating "on" and "off" periods. In many applications one aims to deposit as much energy as possible at a given place in as short time as possible. In laser ablation for example, a small volume of material at the surface of a work piece evaporates if it receives the energy required to heat it up to its boiling point in a sufficiently short time. If, however, the same energy is spread over a longer time, the heat may have time to disperse into the bulk of the piece, and less material evaporates. Laser pulses can vary over a range of duration ranging from milliseconds to femtoseconds, can vary over a range of fluxes, and can be precisely controlled. This makes laser ablation techniques very valuable for both research and industrial applications.

An excimer laser, which is sometimes also called an exciplex laser, is a form of ultraviolet laser which is commonly used in semiconductor manufacturing. The term excimer is short for "excited dimer", while exciplex is short for "excited complex". An excimer laser typically uses a combination of an inert gas such as argon, krypton, or xenon, and a reactive gas such as fluorine or chlorine. Under the appropriate conditions of electrical stimulation, a transient dimer or complex is created, which can only exist in an energized state and produces laser light in the ultraviolet range. For example, an exemplary XeCl excimer laser operates at a wavelength of about 308 nm. However, wavelengths from 150 nm to 500 nm are within the range useful for the present techniques. Excimer lasers are usually operated with a pulse rate of around 100 Hz and a pulse duration of ~10 ns, although some operate as high as 8 kHz and 200 ns.

The optional second or later laser illumination in the disclosed techniques may occur through the use of one or more additional laser(s) with the same or different wavelength or energy as the ablation laser, or using subsequent pulses from the same laser. Indeed, it is possible that the second and subsequent illumination step(s) optionally occurs in the path of a single laser source, which is used both to ablate the target material and to re-melt the ablated material.

Figure 4:
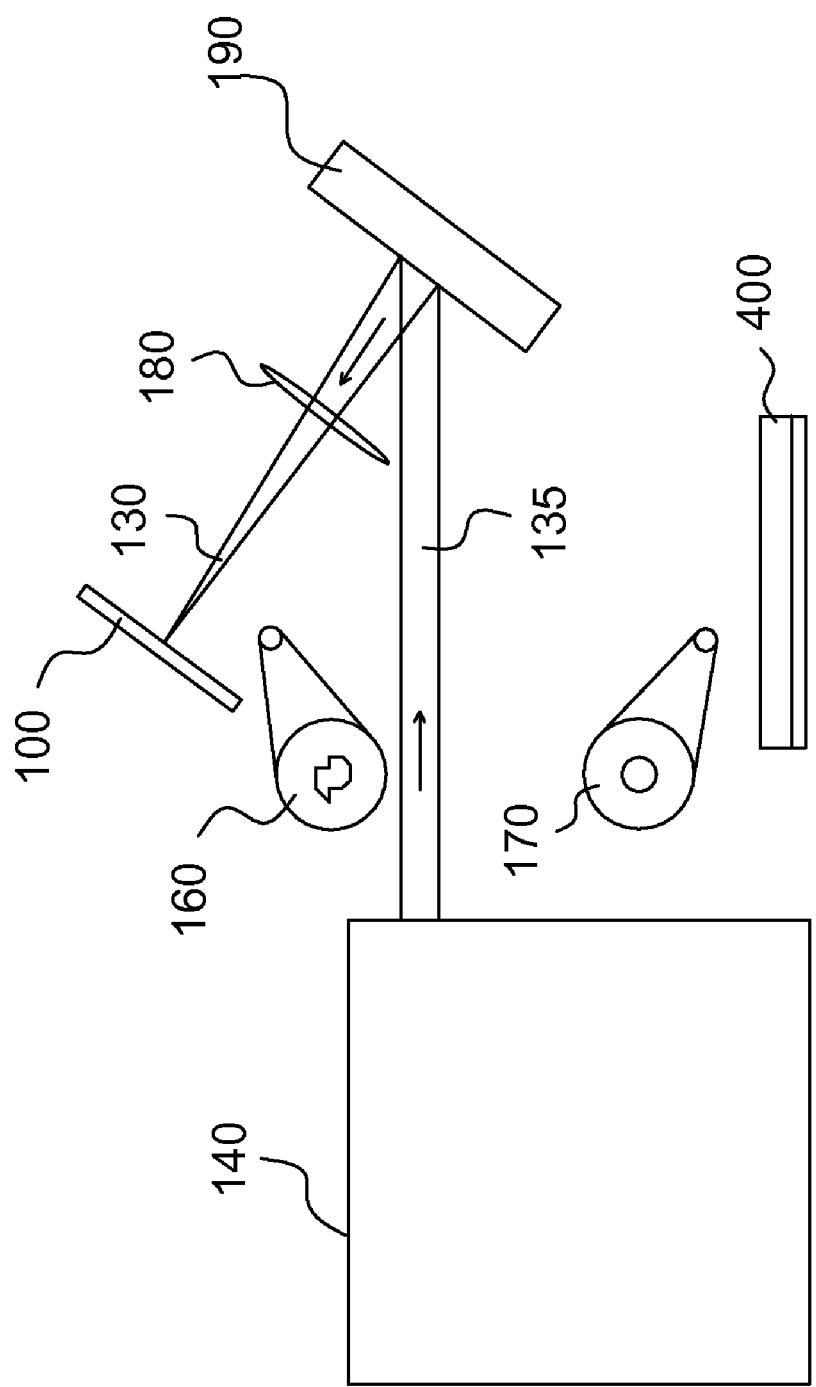
FIG. 4 is a schematic diagram depicting another aspect of the disclosed techniques that can be used to improve the yield of the silicon microspheres by providing a single laser source oriented so that ablated substrate material passes through the laser path a second time.

The ability to use a single laser for both the first laser beam for ablation and the second laser beam for re-melting depends upon the orientation of the laser beam pathways. If for example a mirror (190) and the substrate (100) are oriented as shown in FIGS. 1A and 1C, a single laser pathway does not traverse either the flight of the ejected particles or a subsequent gravity-controlled drop trajectory of the particles, then it is necessary to have additional laser source(s) to produce the second, and any subsequent, unfocused illumination (135). On the other hand, if the mirror (190) and the substrate (100) are oriented as shown in FIG. 4, then the trajectory of the ablated particles and the unfocused laser (135) can be made to intersect, permitting the use of one laser source for ablation and re-melting.

In another embodiment, a second or subsequent laser illumination step(s) occur when the ablated material is not suspended, but while on a surface. In this aspect, the initial ablation forms randomly-shaped material fragments, and the material fragments are formed into a substantially spherical shape particles which are preferably on a scale of less than 10 µm following the second or subsequent laser illumination.

A more specific example of this subject matter pertains to a novel technique for forming silicon microspheres using a pulsed focused laser. The technique is able to exploit the laser ablation action on the silicon substrate, causing the silicon beneath the surface to be superheated to the point where material is ejected (ablated) from the substrate surface. One or more subsequent laser pulses, which are preferably at a lower fluence, melt the ablated material particles to form liquefied droplets while applying the one or more subsequent laser pulses with the ablated material particles suspended in a gaseous environment, for example, air, where the inherent surface tension causes the liquefied silicon droplets to assume a substantially spherical shape as a result of its surface tension. In one aspect, the gas environment for the disclosed technique is silane gas, in which it is expected that the liquefied silicon particles will form highly pure microspheres. In other aspects of this invention, the gaseous environment may include inert gases such as nitrogen, argon, and the like; reactive gases such as air, oxygen, dichlorosilane and the like; and partial pressures of gaseous mixtures including pressures below 760 torr (1 atmosphere).

While cooling the liquefied silicon droplets suspended in a gas is preferred, optionally the liquefied droplets may be permitted to solidify on a surface.

In another aspect, the ablation and melting are executed using a plurality of laser sources. One exemplary second laser for liquefying the ablated material is a carbon dioxide laser, or optionally a second excimer laser. The liquefied droplets solidify while suspended in the gaseous environment, before reaching a collection surface, optionally the ablated substrate (100) of its origin as shown in FIG. 1, on another collection surface (400), as shown in FIG. 4, or by another collection system. In an alternate aspect, one exemplary single laser arrangement is shown in FIG. 4. The resulting microspheres are then collected. Indeed, once the liquefied silicon droplets have cooled, they may optionally be manipulated and/or collected using airflow, such as a vacuum collection system.

Thus, in one embodiment, the disclosed techniques additionally comprise:

placing the substrate under a an optical element (180); and using the optical element to establish an ablation profile for ablating the substrate.

By way of example, a cylindrical lens may be used as an optical element to produce a line profile and a spherical lens may be used as an optical element to produce a spot point profile; however, any combination of optics may be used to produce the required energy densities for ablation and melting of the material including beam homogenizing optics. An exemplary 308 nm wavelength XeCl excimer laser fluence is applied to the focusing lens, producing on the order of 250 mJ/cm$^2$, which corresponds to a 750 mJ laser output energy with a 3 cm by 1 cm beam profile, before focusing. Another exemplary ablation laser wavelength is 193 nm.

The number of laser pulses may be selected for the job at hand, and may be varied, at different portions of the substrate. Each laser pulse normally occurs on a time scale of 10-30 ns and serves to ablate the surface followed by liquefying the smaller silicon particulates that have been ejected from the substrate surface. Changes in the laser wavelength affect the size of the ejected particles. For silicon ablation, shorter wavelengths, corresponding to smaller $\lambda$, are preferred but not required. The resulting preferred size range is 0.5 µm to 5 µm. However, it is possible to produce other ranges of particle sizes, for example 0.05 µm to 50 µm. Further, this technique does not utilize any external parts to come in contact with the microspheres and therefore, very high purity microspheres can be produced.

FIGS. 1A-1C are diagrams schematically depicting cross-sectional views of the steps of one aspect of the disclosed techniques. In FIG. 1A, laser ablation of the substrate surface is initiated. In FIG. 1B, the ablation results in liquification and ejection of substrate particles. In FIG. 1C, resolidification of the particles occurs, and the particles come to rest on the substrate surface.

Figure 2:
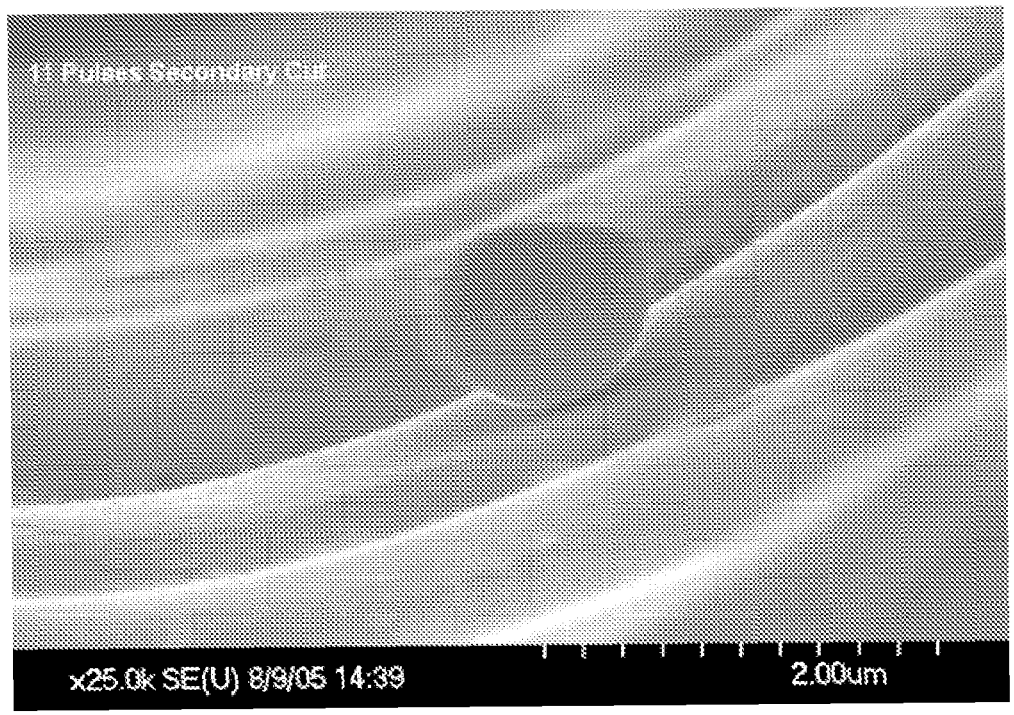
FIG. 2 is a scanning electron microscope (SEM) image of a silicon particle which had not been fully remelted.
Figure 3:
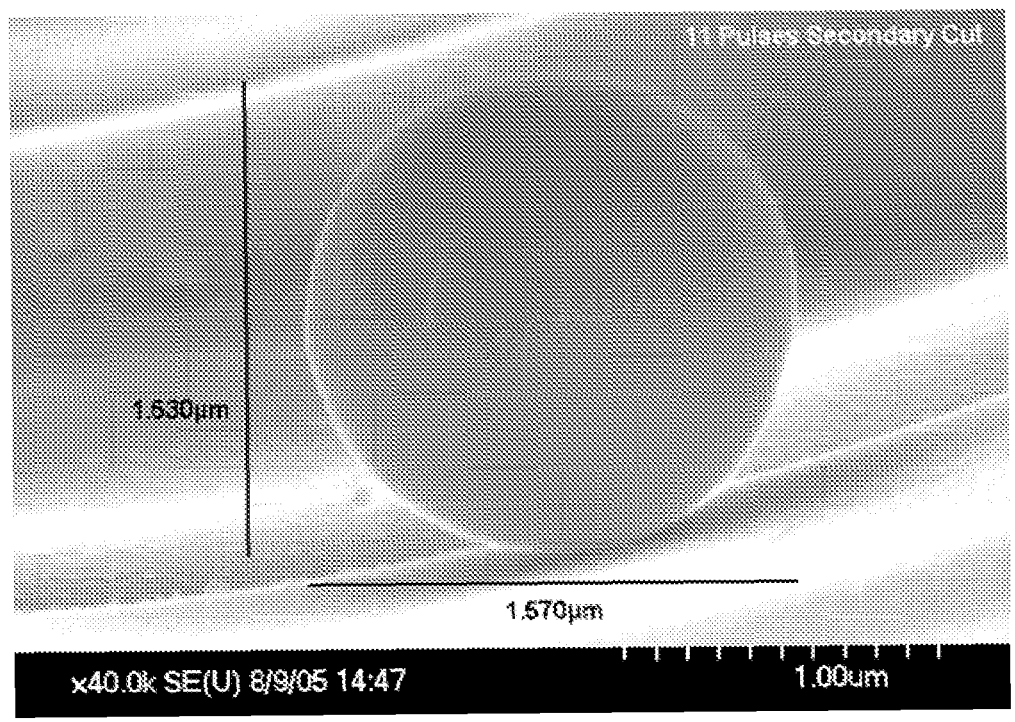
FIG. 3 is a SEM image of an exemplary silicon microsphere formed by a disclosed technique and apparatus.

FIG. 2 is a scanning electron microscope (SEM) image of a particle that had not been fully remelted. FIG. 3 is a SEM image of the silicon microsphere formed by the disclosed technique after being fully remelted. The silicon microsphere depicted in FIG. 3 is imaged with a scanning electron microscope taken at 40,000 times magnification, and showing a horizontal diameter of 1.57 µm and a vertical diameter of 1.53 µm. In FIG. 2, the particle had not been fully remelted and thus not as spherical as the particle of FIG. 3.

FIG. 4 is a schematic diagram depicting an experimental to setup that can be used to improve the yield of the silicon microspheres using a single laser to ablate the substrate material, to illuminate and melt the substrate material a second or subsequent time(s), and to produce a substantially round microsphere. Using a laser apparatus like that depicted in FIG. 4 can result in a relatively continuous "waterfall" of particles falling through the laser beam, where they are liquefied, and then resolidify as microspheres after leaving the beam and cooling.

Alternative Embodiments

This subject matter may be applied to any materials system, including Group IV semiconductors, compound semiconductors such as Group III-V and Group II-VI semiconductors and other ternary and quaternary semiconductor compounds or alloys. The disclosed technique described herein may also be used, in the most general embodiment, with any continuous or pulsed laser, and is not limited to the excimer laser.

It will be understood that many additional changes in the details, materials, steps and arrangement of parts, which have been herein described and illustrated to explain the nature of the present disclosure, may be made by those skilled in the art within the principle and scope of the present disclosure as expressed in the appended claims.

What is claimed is:

1. A method for forming microspheres having a diameter of less than 500 µm, comprising: —providing a base material substrate suitable for producing microspheres, wherein the base material substrate has at least one target surface and subsurface beneath the target surface; —applying energy to the material substrate using a first laser beam, said applied energy sufficient to heat the material substrate surface and subsurface to result in ablation of material from the surface of the substrate to a controlled, selected depth to produce ablated material particles; —permitting the ablated material particles to traverse a laser beam so as to melt the ablated material; —permitting the ablated material to resolidify in a gaseous environment to form a preselected geometry before reaching a collection surface, wherein the collection surface is separate from the base material substrate; and collecting the resolidified ablated material particles which may be manipulated on the collection surface.

2. The method of claim 1, further comprising using a pulsed laser to provide said first laser beam.

3. The method of claim 1, further comprising using a continuous wave laser to provide said first laser beam.

4. The method of claim 1, further comprising using an excimer laser to provide said first laser beam.

5. The method of claim 1, further comprising applying one or more subsequent laser pulses to melt an ablated material particle to form a liquefied droplet, thereby permitting the liquefied droplet to assume a substantially spherical shape as a result of its inherent surface tension.

6. The method of claim 5, wherein the ablation and melting steps are executed using a single laser source.

7. The method of claim 5, wherein the ablation and melting steps are executed using a plurality of laser sources.

8. The method of claim 5, further comprising suspending the ablated material particles in a gaseous environment and applying the one or more subsequent laser pulses while the ablated material particles are suspended in the gaseous environment.

9. The method of claim 5, further comprising applying the one or more subsequent laser pulses with the ablated material particles on a surface.

10. The method of claim 5, further comprising permitting the liquefied droplets to solidify on a surface and manipulating said liquefied droplets using airflow.

11. The method of claim 1, further comprising using a vacuum collection system.

12. The method of claim 1, further comprising selecting the base material from silicon.

* * * * *